Dec. 28, 1943. J. C. HAEFELI 2,337,884

DRIVE TRANSMISSION IN MOTOR VEHICLES

Filed June 10, 1942 2 Sheets-Sheet 1

JULIUS CHARLES HAEFELI,
Inventor
by Lester L. Sargent
Attorney

Dec. 28, 1943.   J. C. HAEFELI   2,337,884
DRIVE TRANSMISSION IN MOTOR VEHICLES
Filed June 10, 1942   2 Sheets-Sheet 2

JULIUS CHARLES HAEFELI
Inventor
by Lester L. Sargent
Attorney

Patented Dec. 28, 1943

2,337,884

UNITED STATES PATENT OFFICE 2,337,884

DRIVE TRANSMISSION IN MOTOR VEHICLES

Julius Charles Haefeli, Birmingham, England, assignor to The Austin Motor Company, Limited, Northfield, Birmingham, England Application June 10, 1942, Serial No. 446,518
In Great Britain June 10, 1941

3 Claims. (Cl. 74—391)

It is found, especially in the case of heavy motor vehicles, and more especially when being started in heavy ground or other difficult position, that a high degree of torsional stress is imposed on the axle shafts with the result that breakages frequently occur. To avoid this, bevel reduction gear has been provided acting between the outer ends of the axle shafts and the hubs of the driving road wheels. The arrangement, in respect of each driving wheel, has been to attach one of the bevel wheels to the respective end of the hollow fixed axle and a like bevel wheel to the end of the respective axle shaft; and, engaging with both of these, are two or more bevel pinions rotatably mounted on studs projecting radially inwards from the hub casing.

By this means part of the overall speed reduction is introduced into the wheel hub causing the axle shaft to rotate at twice the wheel speed thus reducing the torsional stress in the shaft and increasing the factor of safety.

This type of gear whilst being effective is, however, limited to a two-to-one reduction. It further has the objection that it unavoidably occupies considerable space axially of the axle thereby tending to increase the overall width of the vehicle and probably calling for a special design of wheel.

According to the present invention the reduction gear between each axle shaft and the respective driving wheel hub is effected by spur gearing. This may be constituted, in the simplest form, by a spur wheel fixed on the outer end of the axle shaft and gearing with one or more intermediate pinions adapted to rotate about axes which are fixed in relation to the hollow fixed axle and extend in a direction parallel to the axle shaft. These intermediate pinions engage also with an internally toothed ring fixed within, or integral with, the wheel hub. With this arrangement of gear wheels the reduction of speed will be represented by the ratio of the teeth on the spur wheel on the axle shaft to the teeth on the internally toothed ring; and this can, of course, be any desired ratio within reasonably wide limits. The gear ratio becomes increased by reducing the number of teeth on the spur wheel or increasing the number of teeth on the internally toothed ring.

The intermediate pinions may, if desired, be arranged in pairs, the pinions of each pair being of different diameters being placed side-by-side and rigidly connected together or formed integrally, in which case one pinion of each pair will engage with the spur wheel and the other pinion with the internally-toothed ring. In this case the gear ratio may be further varied by varying the ratio between the teeth of each pair of pinions.

If there are three or more pinions with which the spur wheel engages, such engagement forms sufficient support for the outer end of the axle shaft, whereby a separate bearing to support such end may be dispensed with if so desired.

In the two arrangements referred to above the direction of rotation of the hubs will be the opposite of the direction of rotation of the axle shafts; but, if desired, the intermediate pinions may be arranged in pairs the pinions of which have their teeth interengaging. In such case one pinion will be so mounted as to engage the spur wheel and the other the toothed ring of the hub. With this arrangement the direction of rotation of the hub will be the same as that of the axle shaft.

By arrangements as described it is possible to have, in the hub, ratios other than two-to-one, thus giving flexibility of design, and also to accommodate the gearing within the width of standard wheel assemblies thus avoiding any increase in the overall width of the vehicle.

Convenient embodiments of the invention are described with reference to the accompanying drawings, in which—

Figure 1:
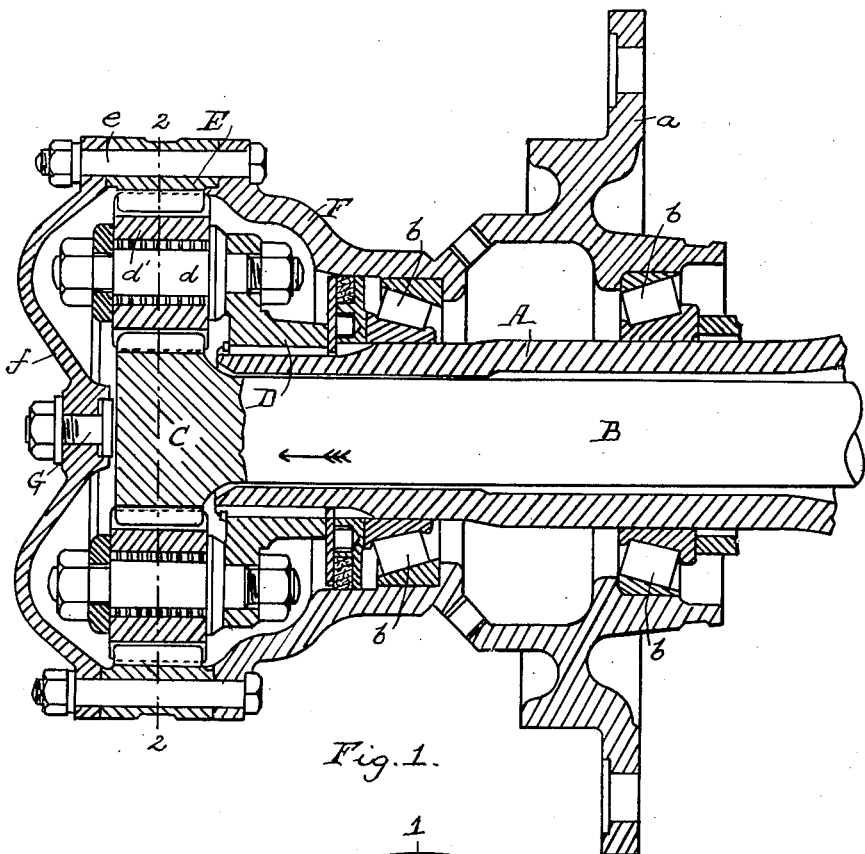
Figure 1 is a longitudinal section of a wheel hub and axle end arranged according to one form of the invention, the section being taken in the plane indicated by the line 1, 1, of Figure 2.
Figure 2:
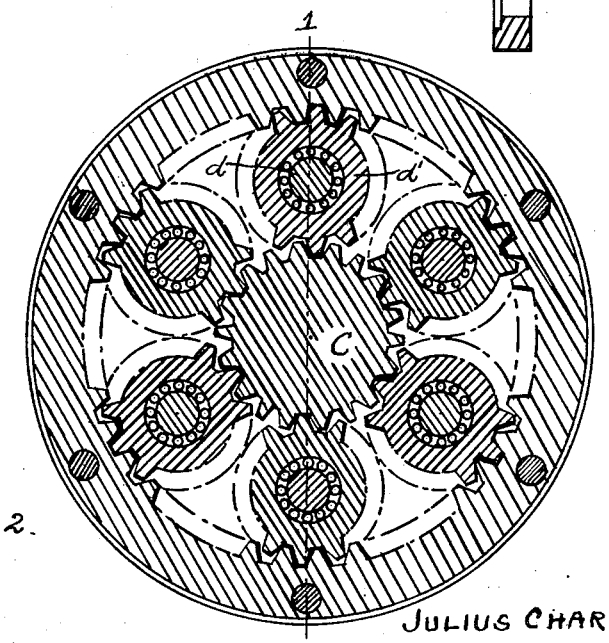
Figure 2 is a transverse section, in somewhat diagrammatic form, the section being taken in the plane indicated by the line 2, 2, of Figure 1.

Referring first to Figures 1 and 2, A denotes the fixed axle casing of a motor vehicle, B the respective axle shaft, and C a spur wheel integral with the shaft B. Splined on the outer end of the axle casing A is a spider D carrying six short parallel studs or arbors d and on each of these is turnably mounted an intermediate pinion d' meshing with the spur wheel C and with internal teeth of a toothed ring E bolted by bolts e to the hub shell F. This latter is turnably mounted on the axle casing A by roller bearings $b$ in the usual manner. The hub shell has the usual flange $a$ for the attachment thereto of the detachable wheel. The only support which the shaft B receives at its outer end is by way of the pinions $d'$. $f$ is the hub cap in which is secured a central thrust piece G to prevent outward movement of the axle shaft B. The hub cap is secured in position by the bolts $e$.

The shaft B, with the spur wheel C, being driven in the usual manner from the differential, rotates the intermediate pinions $d'$ on their fixed arbors $d$ and these pinions in turn rotate the toothed ring E and hence the wheel hub, but in a direction of rotation opposite to that of the shaft B. The direction of rotation of the latter is of course arranged accordingly. The pinions $d'$ act merely as idle wheels so that the gear ratio is determined simply by the ratio of the number of teeth on the spur wheel C to the number of teeth on the toothed ring E. In the present instance the reduction in speed is approximately 2½ to 1. This ratio can be increased by reducing the number of teeth on the wheel C or by increasing the number of teeth on the toothed ring E, the pinions $d'$ being modified to suit. It will be seen that the spider D can be readily removed from the axle casing A after the hub cap $f$ has been removed and the axle shaft withdrawn.

Figure 4:
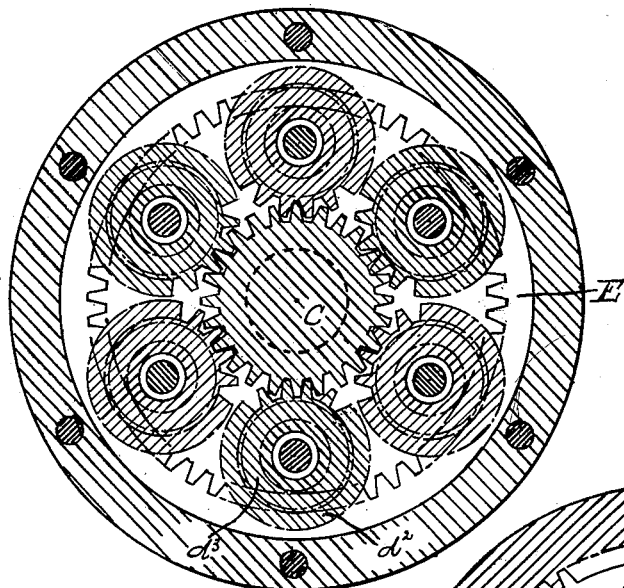
Figure 4 is a somewhat diagrammatic view corresponding to Figure 2, but illustrating the modification shown in Figure 3. In this view the various toothed wheels are, for the sake of clearness, indicated by their pitch lines only; and, Figure 5 is a somewhat diagrammatic view corresponding to Figure 2, but illustrating a further modification.
Figure 3:
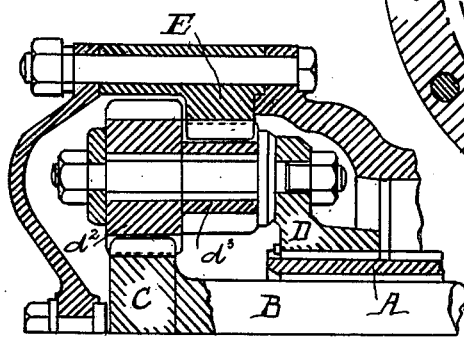
Figure 3 is a fragmentary longitudinal section to illustrate a modified form of the invention.

Referring to Figures 3 and 4, the construction is similar to that shown in Figures 1 and 2 except that the intermediate pinions $d'$ are replaced by pairs of pinions one pinion $d^2$ of each pair being of larger diameter than the other $d^3$, these pinions being rigidly connected together.

The pinions $d^2$ mesh with and are driven by the spur wheel C and they in turn drive the pinions $d^3$. The pinions $d^2$ do not engage with the toothed ring E, the engagement of the latter being by the pinions $d^3$. In this case the gear reduction is greater than the ratio of the teeth of the wheel C to the teeth of the ring and must be multiplied by the ratio of the teeth of each pinion $d^2$ to the teeth of its respective pinion $d^3$. In this case also the direction of the rotation of the hub is the reverse of the direction of rotation of the axle shaft B.

Figure 5:
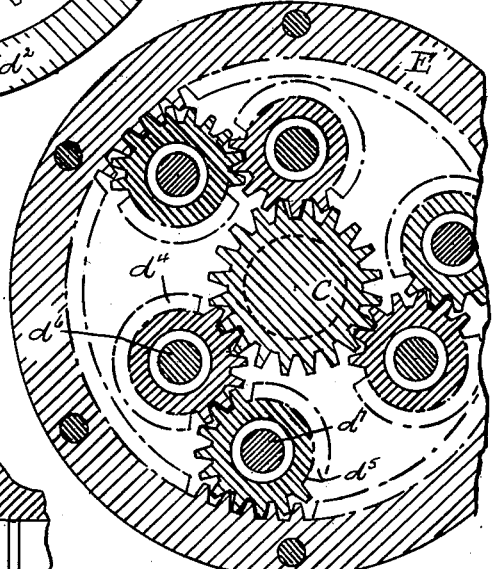

Referring to Figure 5 the construction is again similar, but, in this case, the intermediate pinions are arranged in pairs, the pinions $d^4$, $d^5$, of each pair meshing together and being mounted on separate arbors $d^6$, $d^7$, rigid with the spider, not shown in this view, but splined to the axle casing as in the other modifications. The wheel C drives each of the pinions $d^4$ and these in turn drive the pinions $d^5$ which drive the toothed ring E. The pinions $d^4$ do not engage with the toothed ring, nor do the pinions $d^5$ mesh with the wheel C.

In the above case the pinions $d^4$ and $d^5$ are of the same diameter and act as idle wheels so that the gear ratio is that of the number of teeth on the wheel C to the number of teeth on the toothed ring E; but, contrary to the other modifications, the direction of rotation of the hub is the same as that of the axle shaft B. In this case a one-to-one drive could be obtained by freeing the spider D from the axle casing and locking any of the other wheels together or to the spider. Each pinion $d^4$ may have a less number of teeth than those of the respective pinion $d^5$ and thus obtain a further gear reduction.

Having fully described my invention what I claim and desire to secure by Letters Patent is:

1. Hub reduction gear comprising a wheel hub, a location on said hub to receive a detachable wheel, a gear casing extending forwardly of said location, an internally toothed ring of said casing, a driving shaft, a toothed wheel on said driving shaft, a fixed axle casing, intermediate toothed wheels engaging said spur wheel and said internally toothed ring, studs fixed in relation to said fixed axle casing and carrying said intermediate wheels, and said gear casing being of such diameter as to allow of said detachable wheel being passed over it for engagement with said location.

2. Hub reduction gear comprising a wheel hub, a location on said hub to receive a detachable wheel, a gear casing extending forwardly of such location, an internally toothed ring forming the peripheral wall of said casing, a driving shaft, a toothed wheel on said driving shaft, a fixed axle casing, intermediate toothed wheels engaging said spur wheel and said internally toothed ring, studs fixed in relation to said fixed axle casing and carrying said intermediate wheels, and said gear casing being of such diameter as to allow of said detachable wheel being passed over it for engagement with said location.

3. Hub reduction gear comprising a wheel hub, a location on said hub to receive a detachable wheel, a gear casing extending forwardly of such location, a cap forming a closure to the outer end of said casing, an internally toothed ring bolted between said cap and a flange of said gear casing, said ring forming the peripheral wall of said gear casing, a driving shaft, a toothed wheel on said driving shaft, a fixed axle casing, intermediate toothed wheels engaging said spur wheel and said internally toothed ring, studs fixed in relation to said fixed axle casing and carrying said intermediate wheels, and said gear casing being of such diameter as to allow of said detachable wheel being passed over it for engagement with said location.

JULIUS CHARLES HAEFELI.